(12) United States Patent
Bureau

(10) Patent No.: US 12,162,797 B2
(45) Date of Patent: Dec. 10, 2024

(54) COATING WITH THERMAL STABILITY AND ANTI-SCRATCH PROPERTIES, GLASS PRODUCT HAVING SUCH COATING, VARNISH PRODUCT FOR PRODUCING SUCH COATING AND METHOD FOR PROTECTING A GLASS SURFACE AND IN PARTICULAR A PHARMACEUTICAL PRIMARY GLASS CONTAINER

(71) Applicant: CORNING INCORPORATED, Corning, NY (US)

(72) Inventor: Christophe Bureau, Grenoble (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/896,897

(22) Filed: Aug. 26, 2022

(65) Prior Publication Data

US 2023/0002272 A1 Jan. 5, 2023

Related U.S. Application Data

(62) Division of application No. 16/093,345, filed as application No. PCT/EP2017/058935 on Apr. 13, 2017.

(30) Foreign Application Priority Data

Apr. 14, 2016 (IT) .................... 102016000038592

(51) Int. Cl.
*C03C 17/30* (2006.01)
*C03C 17/00* (2006.01)

(52) U.S. Cl.
CPC ............ *C03C 17/30* (2013.01); *C03C 17/005* (2013.01); *C03C 2217/20* (2013.01); *C03C 2217/78* (2013.01)

(58) Field of Classification Search
None
See application file for complete search history.

(56) References Cited

U.S. PATENT DOCUMENTS 5,037,871 A   8/1991  Jones
5,958,514 A * 9/1999  Havey .................... C08K 5/092
                                                    427/393

2003/0108676 A1   6/2003  Shimamura et al.
2013/0034702 A1 * 2/2013  Bockmeyer .......... C09D 183/04
                                                        524/588
2013/0171456 A1 * 7/2013  Fadeev ................. C03C 21/002
                                                        428/429
2013/0299378 A1 * 11/2013  Sharma ................... C03C 17/25
                                                        65/17.2
2015/0354263 A1  12/2015  Roberts

FOREIGN PATENT DOCUMENTS

| EP | 0401736 A1 | * 12/1990 |
| JP | 2017181959 A | * 10/2017 |
| KR | 10-1338923 B1 | 12/2013 |
| KR | 10-2016-0036699 A | 4/2016 |
| KR | 10-2057242 B1 | 12/2019 |
| WO | 2004/111691 A1 | 12/2004 |
| WO | 2019/186115 A1 | 10/2019 |

OTHER PUBLICATIONS

English machine translation of JP-2017-181959 (2017).*
European Patent Application No. 17717176.6 Communication under Rule 71(3) EPC dated Sep. 26, 2019; 6 Pages; European Patent Office.
European Patent Application No. 17717176.6 Decision to grant a European patent dated Jan. 30, 2020; 2 Pages; European Patent Office.
International Preliminary Report On Patentability of the International Searching Authority; PCT/EP2017/058935; Mailed Oct. 25, 2018; 7 Pages; European Patent Office.
International Search Report and Written Opinion of the International Searching Authority; PCT/US2021/060068; mailed on Mar. 22, 2022, 11 pages; Korean Patent Office.
PCT/EP2017/058935 International Search Report mailed Jun. 21, 2017.

\* cited by examiner

*Primary Examiner* — Ramsey Zacharia

(74) *Attorney, Agent, or Firm* — F. Brock Riggs

(57) ABSTRACT

The present invention describes a coating with lubricating and anti-scratch properties, comprising glycidoxypropyltrimethoxysilane and phenyltriethoxysilane. The present invention further describes a varnish product for producing such coating and a glass product, in particular a pharmaceutical primary glass container having such coating. Last, but not least, a method is disclosed for protecting a glass surface.

15 Claims, No Drawings

COATING WITH THERMAL STABILITY AND ANTI-SCRATCH PROPERTIES, GLASS PRODUCT HAVING SUCH COATING, VARNISH PRODUCT FOR PRODUCING SUCH COATING AND METHOD FOR PROTECTING A GLASS SURFACE AND IN PARTICULAR A PHARMACEUTICAL PRIMARY GLASS CONTAINER

CROSS-REFERENCE TO RELATED APPLICATIONS

This is a divisional application of U.S. patent application Ser. No. 16/093,345 filed on Oct. 12, 2018, which is the U.S. National Stage Application of international Patent Application No. PCT/EP2017/058935, filed on Apr. 13, 2017, which claims priority to Italian Patent Application No. 102016000038592, filed on Apr. 14, 2016, the contents of each of which is incorporated herein by reference in its entirety.

FIELD OF DESCRIPTION

The present invention relates to a transparent protective coating with anti-scratch properties. Such coating is made for a glass product and in particular a pharmaceutical primary glass container.

During manufacturing and their use in the filling lines of pharmaceutical companies, primary glass containers (such as bottles, cartridges, syringes, vials for pharmaceutical applications) suffer a series of impacts and contact that can create defects on their surface. Such defects may be the source of micro-cracks and be at the origin of fractures in glass containers, anywhere from the production lines to the filling lines, right up to the hands of the patient.

The same is valid for any glass surface: defects are at the origin of fractures in glasses: this constitutes an active field of improvement of products in the screens of smartphones and tablets, but also naturally for any type of flat glass surface exposed to real conditions such as windscreens, windows, etc.

BACKGROUND OF THE INVENTION

Many solutions proposed up to now consisted of inventing new glass materials, intrinsically more resistant to mechanical limitations. This can happen by changing the nature of the minerals that are part of the composition of the molten mass when the glass is produced or by making a posteriori changes through ion exchange—by immersing the glass in a bath of molten ion liquid to force the exchange of sodium ions through ions with a higher valency such as aluminium. In both cases, the motivation is comparable: an attempt is made to increase the bulk modulus of all or part of the glass object by increasing the electrostatic interactions between the glass components and therefore "contracting" the 3D structure of the material and making it less susceptible to breaks originating from or mediated by the propagation of a crack.

A significant drawback of such approach is that it intrinsically changes the nature of the glass and often many of its collateral properties. In most applications (and in particular in the pharmaceutical sector), the recharacterization and/or legislative validation must be performed ex-novo when such changes do not simply prevent the use of the object constituted by these new glass materials, for example due to unacceptable levels of extractables or substances that can be released when the glass comes into contact with a pharmaceutical formulation.

SUMMARY OF THE INVENTION

Attempts have been made on various occasions to solve the issue of glass breaking due to surface scratches through organic or mineral coatings, but the solutions are often reciprocally exclusive of some types of limitations. The organic layers may offer good results and may be easy to process but are not suitable if the object is subjected to a high thermal balance, while the inorganic layers may be suitable for high temperature changes but are obtained through deposition processes that imply a series of limitations, therefore not compatible with all situations and in particular with the industrial scale.

Since surface scratches on glass are precursors to fractures which ultimately propagate into the mass of the material and cause macroscopic breakage, up to now the solutions to such problem have consisted of limiting such scratches or limiting their capacity to act as precursors to fractures.

A first solution consists of implementing the "Non Glass To Glass Contact" (NGTGC) process, with which it is possible to limit or even eliminate the presence of scratches on the surface of primary glass containers such as cartridges or bottles: the resulting contraction force, necessary for breaking the container making it collapse, is therefore 3 to 4 times higher than the contraction force for a similar container that has not be subjected to an NGTGC production process. The main disadvantage of this approach is that when the glass objects produced through NGTGC suffer a single contact—either in the factory of the glass manufacturer or in the factory of the pharmaceutical company—with an object able to scratch the surface of the glass (other glass surface, metal surface etc.), their contraction force is suddenly reduced to a value comparable to that of an object produced without NGTGC and all the advantages of NGTGC are lost because of a single contact.

A second solution consists of increasing the surface energy of the glass in its surface and subsurface by varying its formulation, at least on a given thickness below the surface, for example by introducing aluminium ions in the place of sodium cations. This process is called ion exchange and it is performed by immersing the glass in a molten salt bath at about 300-350° C. for a number of hours. Such process is heavy from an industrial point of view, intrinsically performed in series and requires installations of an impressive size to be economically feasible. Regardless of the nature of the glass used in the underlying part, the ion exchange process changes the chemical composition of the same surface which will be in contact with the formulation that it is to contain: this can change the container/content interaction and require validation of the most significant changes, which often dissuades, for example, pharmaceutical companies.

Attempts have been made on various occasions to solve the question of glass breaking due to surface scratches through coatings such as, for example, in US2013/0171456 A1, which describes a low-friction coating connected to a glass surface and comprising a polymeric chemical formulation. In the aforementioned document, the inventors observe that when such low friction coefficient is applied to the surface of glass pharmaceutical containers such as bottles, the surface of said bottles is slightly damaged following the scratching of one bottle with respect to another. No scientific explanation for such observation is provided, but an article published in 1989 (H. H. Chen, "*Scratch resistant low-friction/low surface energy coating for silicon substrate*". Applied Polymer Science, 37(2), 349-364) provides an example of an ultra thin "soft" layer on a silicone surface that displays higher anti-scratch properties and concludes that they are due to the absence of deformation and tear components and components with reduced adhesion in the slide resistance mechanism.

Such soft coatings are providing good results as soon as they are totally uniform and remain unaltered during the processes. Friction with surfaces having for example higher roughness than the thickness of the layer may cause a scratch on the underlying surface, since the coating material is usually also very soft (a polymer in the two cases above). The same could occur when the surface is hit by a pointed portion that is longer than the thickness of the coating in at least one of its dimensions.

It is well known that the lubricating and anti-scratch coating is performed well through organic species such as polytetrafluoroethylene or inorganic species such as silicone.

The task of the present invention is to design a new and inventive solution with respect to the prior art which gives the glass product a transparent surface coating with anti-scratch properties and resistance to mechanical damage.

Within the scope of such technical task, an object of the present invention is to provide a glass product with anti-scratch, sliding and transparency properties, hence increasing its compressive strength, minimizing the quantity of defects on its surface which can act as precursors to fractures. There is also the need for a method through which the improvement in anti-scratch properties of the surface of a glass container can translate into greater overall resistance to breaking of the same glass composition.

Last but not least, an object of the present invention is to provide a coating with anti-scratch properties and resistance to mechanical damage within the context of an eco-compatible production process.

The technical task and such objects according to the present invention are reached through the provision of a coating with lubricating and anti-scratch properties, characterized in that it comprises glycidoxypropyltrimethoxysilane and phenyltriethoxysilane.

The present invention further describes a glass product that implements such coating and a pharmaceutical primary glass container that implements such coating.

The present invention further describes a varnish product for producing such coating, characterized in that it comprises glycidoxypropyltrimethoxysilane and phenyltriethoxysilane and a solvent. Advantageously, said varnish derives from a sol-gel varnish synthesis. Such process allows the coating properties to be modulated by selecting the appropriate precursors, synthesis conditions and coating process.

Last but not least, the present invention describes a method for protecting a glass surface of a glass product characterized in that it comprises a step of applying such varnish product.

According to a preferred embodiment of the invention said method of protecting a glass surface comprises an activation step through a low pressure plasma treatment or atmospheric plasma treatment of the glass surface prior to the application of such varnish coating to confer wettability and adherence of the varnish product.

According to a preferred embodiment of the invention the low pressure plasma treatment is performed with a mixture of $N_2/H_2$ gas and the atmospheric plasma treatment is performed with air. After the synthesis of the varnish, the coating will be performed through spray coating or immersion coating with a specific machine.

The coating applied in this way is then hardened.

In a preferred embodiment of the present invention, pharmaceutical primary glass containers produced through an NGTGC process are subsequently coated with an anti-scratch coating in compliance with the present invention. The resulting pharmaceutical primary containers demonstrate greater long-lasting break strength than primary containers that are not treated with the coating according to the invention. It is therefore considered that this is due to the fact that the NGTGC process confers greater break strength and the coating according to the present invention prevents scratches occurring, hence "freezing" the advantages of the NGTGC process in that way also when the primary containers are further packaged and used in a standard filling line, in which they are exposed to contact between containers, but also contact with metal parts.

Advantageously, the coating made according to the present invention is ecological, which means that the compounds used in the design of the formulation comply with REACH and do not present safety risks.

Naturally, a coating according to the present invention may be used for making glass containers for pharmaceutical applications such as bottles, cartridges, syringes or vials for preventing mechanical damage or breaking, but may also be used in other fields of application such as glass packaging for food and drink and products for personal hygiene, windows, screens, optical components, lighting, glasses and watches. Furthermore, the present invention may be applied on other substrates such as plastics, fabrics, ceramics, metals and alloys in which anti-fingerprint tribological properties and/or high thermal properties are to be obtained.

Specific embodiments of the production process of the coating and the application thereof according to the present invention are described below.

DETAILED DESCRIPTION

Configuration A

Such configuration consists of a single-layer coating.

The general formulation of the varnish product contains:

glycidoxypropyltrimethoxysilane due to its mechanical properties phenyltriethoxysilane due to its thermal stability Configuration A—Synthesis of the Varnish A varnish formulation has been developed based on a mixture between glycidoxypropyltrimethoxysilane and phenyltriethoxysilane. The implied solvent (ethanol or propylene glycol methyl ether) depends on the coating process used:

For immersion coating, ethanol is used as the solvent.

For spray coating, propylene glycol methyl ether is used as the solvent.

The different weight percentages in the general formulation of the varnish are listed below:

| Compound | Percentage by weight |
|---|---|
| Glycidoxypropyltrimethoxysilane | 2-8.00% |
| Phenyltriethoxysilane | 2-8.00% |
| Solvent (propylene glycol methyl ether or ethanol according to the process) | 60-96.0% |
| HCl (0.1N) | 1-2% |
| Photoinitiator | 0.1-1% |

Glycidoxypropyltrimethoxysilane and phenyltriethoxysilane are hydrolyzed separately with hydrochloric acid (10%) in stoichiometric proportion for at least 1 hour under magnetic agitation at ambient temperature.

Hydrolyzed glycidoxypropyltrimethoxysilane and phenyltriethoxysilane are then mixed together and the solvent is added. The solution is agitated for a number of minutes. A photoinitiator, for example Irgacure PAG 290, is then added to the formulation. Such photoinitiator guarantees the cross-linking of the organic portions under UV light.

At this point the varnish formulation is ready to use.

The specific varnish formulations and their characteristics are listed below.

Specific Varnish Formulation A1 (Intended Use for Immersion Coating)

| Precursor | role | |
|---|---|---|
| (3-Glycidyloxypropyl)trimethoxysilane Glymo | Precursor | 4% |
| Phenyltriethoxysilane | Precursor | 4% |
| Hydrochloric acid (0.1N) | activator | 1.9% |
| PAG 290 | UV Photoinitiator | 0.1% |
| Ethanol | Solvent | 90% |

100 g Synthesis of Varnish Formulation A1.

Introduction of 4 g of Glymo in a first glass beaker and addition of 0.9 g of hydrochloric acid.

In a second glass beaker, addition of 4 g of phenyltriethoxysilane and 1 g of hydrochloric acid.

Mixture of the beakers for 1 hour under magnetic agitation (250-300 rpm).

Mixture of the beaker with Glymo with one of phenyltriethoxysilane until homogenization (1 minute at 250-300 rpm).

Addition of 90 g of ethanol and 0.1 g of PAG 90. The solution is left for 10 minutes under magnetic agitation (250-300 rpm).

As mentioned, the varnish is then coated onto the glass substrate through immersion coating and then hardened with UV (60 seconds—mercury lamp).

Properties of the Varnish Formulation A1 (Liquid Phase)

| Density | 0.811 |
|---|---|
| Solid content | 0.95% |
| Viscosity | 1.5 cP |
| Colour/appearance | Transparent/colourless |
| Surface tension (mN/m) | 21.3 |
| pH | 2.5 |

Specific Varnish Formulation A2 (Intended Use for Spray Coating)

| Precursor | role | |
|---|---|---|
| (3-Glycidyloxypropyl)trimethoxysilane Glymo | Precursor | 4% |
| Phenyltriethoxysilane | Precursor | 4% |
| Hydrochloric acid (0.1N) | Activator | 1.9% |
| PAG 290 | UV Photoinitiator | 0.1% |
| Propylene glycol monomethyl ether acetate Dowanol | Solvent | 90% |

100 g Synthesis of Varnish Formulation A2.

Introduction of 4 g of Glymo in a first glass beaker and addition of 0.9 g of hydrochloric acid.

In a second glass beaker, addition of 4 g of phenyltriethoxysilane and 1 g of hydrochloric acid.

Mixture of beakers for 1 hour under magnetic agitation (250-300 rpm).

Mixture of the beaker with Glymo with one of phenyltriethoxysilane until homogenization (about 1 minute at 250-300 rpm).

Addition of 90 g of Dowanol and 0.1 g of PAG 90. The GFD solution is left for 10 minutes under magnetic agitation (250-300 rpm).

As mentioned, the varnish is then coated onto the glass substrate through spray coating and then hardened with UV (60 seconds—mercury lamp).

Properties of the Vanish Formulation A2 (Liquid Phase)

| Density | 0.973 |
|---|---|
| Dry matter content | 0.62% |
| Viscosity | 1.5 cP |
| Colour/appearance | Transparent/slightly yellow |
| Surface tension (mN/m) | 25.2 |
| pH | 1.6 |

Coating Process

The process described below refers to pharmaceutical primary glass containers only by way of example, since the application may, as mentioned, also include other types of substrates.

Cleaning/Degreasing

For glass bottles, the pretreatment process is the same for every configuration.

Before being coated, each bottle is degreased with fabric and ethanol. Subsequently, the bottles are treated by atmospheric plasma with air for 30 s. In a different embodiment, a low pressure plasma treatment with a mixture of $N_2/H_2$ gas may be performed.

The bottles are coated following this treatment.

Coting

In configuration A with propylene glycol methyl ether, the coating process is performed through spray coating. In that case, the spraying is performed for 0.4 s at a pressure at the nozzle of 50 psi. While the varnish is sprayed, the bottle rotates at a speed of 480 rpm.

In configuration A with ethanol, the coating process is performed through immersion coating. In that case the extraction speed is 50 mm/min.

Hardening

After the deposition process, the coatings must be hardened under UV light with the following wavelengths, UVA (320-390 nm), UVB (280-320 nm), UVC (250-260 nm), UVV (395-445 nm) for 3 min.

It is to be understood that changes and variations that are not beyond the scope of the invention as defined in the appended claims may be made to the coating and to the related production method described and illustrated herein.

The invention claimed is:

1. A pharmaceutical primary glass container having a coating comprising glycidoxypropyltrimethoxysilane and phenyltriethoxysilane, wherein the organic portions of the glycidoxypropyltrimethoxysilane and the organic portions of the phenyltriethoxysilane are UV cross-linked, wherein the organic portions of the glycidoxypropyltrimethoxysilane comprise glycidoxypropyl functional groups and the organic portions of the phenyltriethoxysilane comprise phenyl functional groups.

2. The pharmaceutical primary glass container according to claim 1, wherein said coating has a thickness of less than 50 nm.

3. The pharmaceutical primary glass container according to claim 1, wherein the coating is formed by a process comprising:
preparing a varnish product comprising the glycidoxypropyltrimethoxysilane, the phenyltriethoxysilane, an acid, a photoinitiator, and a solvent, wherein the glycidoxypropyltrimethoxysilane and the phenyltriethoxysilane in the varnish product are not cross-linked;
applying the varnish product onto the pharmaceutical primary glass container; and
hardening the varnish product by exposing the varnish product to UV light, wherein exposing the varnish product to UV light causes activation of the photoinitiator which initiates cross-linking between the organic portions of the glycidoxypropyltrimethoxysilane and the organic portions of the phenyltriethoxysilane.

4. The pharmaceutical primary glass container according to claim 3, wherein the glycidoxypropyltrimethoxysilane and the phenyltriethoxysilane are each in a weight percentage from 2% to 8% of the varnish product.

5. The pharmaceutical primary glass container according to claim 3, wherein the acid in the varnish product comprises HCl (0.1N) in a weight percentage from 1% to 2% of the varnish product, and the varnish product comprises a weight percentage of the photoinitiator of from 0.1% to 1% of the varnish product.

6. The pharmaceutical primary glass container according to claim 3, wherein the solvent is either ethanol or propylene glycol methyl ether.

7. The pharmaceutical primary glass container according to claim 6, wherein the solvent is ethanol.

8. The pharmaceutical primary glass container according to claim 6, wherein the solvent is propylene glycol methyl ether.

9. The pharmaceutical primary glass container according to claim 1, wherein the coating is formed from a varnish product comprising:
the glycidoxypropyltrimethoxysilane in a weight percentage from 2% to 8% of the varnish product;
the phenyltriethoxysilane in a weight percentage from 2% to 8% of the varnish product;
a solvent in a weight percentage from 60% to 96% of the varnish product;
HCl (0.1N) in a weight percentage from 1% to 2% of the varnish product; and
a photoinitiator in a weight percentage from 0.1% to 1% of the varnish product.

10. The pharmaceutical primary glass container according to claim 9, wherein the solvent is ethanol.

11. The pharmaceutical primary glass container according to claim 9, wherein the solvent is propylene glycol methyl ether.

12. The pharmaceutical primary glass container according to claim 1, wherein the organic portions of the glycidoxypropyltrimethoxysilane and the organic portions of the phenyltriethoxysilane are UV cross-linked, wherein the UV cross-linking is enabled by a photoinitiator.

13. The pharmaceutical primary glass container according to claim 1, wherein the coating consists of: hydrolyzed glycidoxypropyltrimethoxysilane; hydrolyzed phenyltriethoxysilane; a photoinitiator; and, optionally a solvent, HCl, or both; wherein:
organic portions of the hydrolyzed glycidoxypropyltrimethoxysilane and organic portions of the hydrolyzed phenyltriethoxysilane are cross-linked through UV hardening initiated by the photoinitiator;
the organic portions of the hydrolyzed glycidoxypropyltrimethoxysilane comprise the glycidoxypropyl functional groups; and
the organic portions of the hydrolyzed phenyltriethoxysilane comprise the phenyl functional groups.

14. A pharmaceutical primary glass container comprising a coating, wherein the coating is prepared by a process comprising:
hydrolyzing glycidoxypropyltrimethoxysilane and phenyltriethoxysilane with an acid to produce hydrolyzed glycidoxypropyltrimethoxysilane and hydrolyzed phenyltriethoxysilane, respectively;
combining the hydrolyzed glycidoxypropyltrimethoxysilane, the hydrolyzed phenyltriethoxysilane, a solvent, and a photoinitiator to produce a varnish product;
coating the varnish product onto the pharmaceutical primary glass container; and
hardening the varnish product by exposing the varnish product to UV light, wherein:
exposing the varnish product to UV light activates the photoiniator, which causes cross-linking between organic portions of the hydrolyzed glycidoxypropyltrimethoxysilane and organic portions of the hydrolyzed phenyltriethoxysilane to produce the coating;
the coating has the organic portions of the glycidoxypropyltrimethoxysilane cross-linked with the organic portions of the phenyltriethoxysilane;
the organic portions of the glycidoxypropyltrimethoxysilane comprise the glycidoxypropyl functional groups; and
the organic portions of the phenyltriethoxysilane comprise the phenyl functional groups.

15. The pharmaceutical primary glass container according to claim 14, wherein the varnish product consists essentially of:
the glycidoxypropyltrimethoxysilane in a weight percentage of from 2% to 8% of the varnish product;
the phenyltriethoxysilane in a weight percentage of from 2% to 8% of the varnish product;
a solvent in a weight percentage of from 60% to 96% of the varnish product;
an HCl solution in a weight percentage of from 1% to 2% of the varnish product, wherein the HCl solution comprises 0.1N HCl in water; and
the photoinitiator in a weight percentage of from 0.1% to 1% of the varnish product.

* * * * *